Aug. 16, 1938.  F. KABAT  2,127,034
LINEMAN SAFETY BELT
Filed March 20, 1937
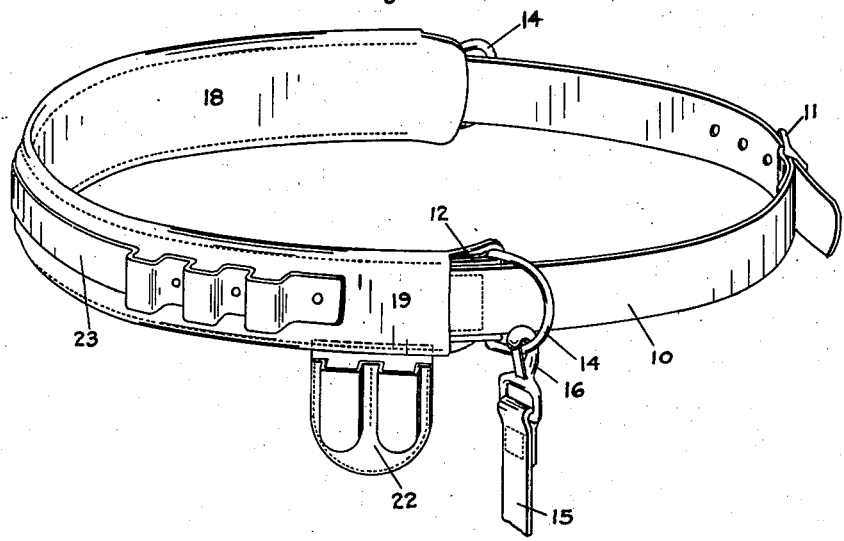
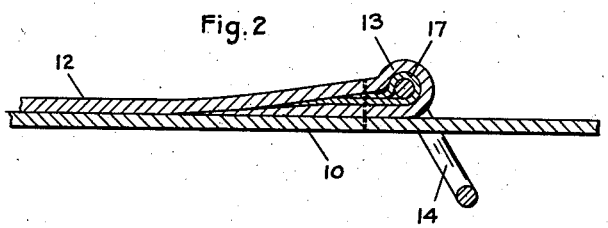
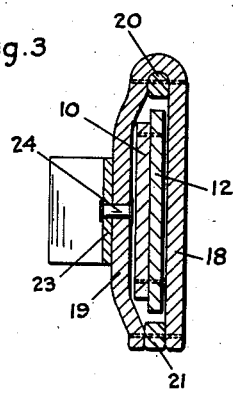
Inventor
Frank Kabat
By Emil F Lange
Attorney Patented Aug. 16, 1938

2,127,034

UNITED STATES PATENT OFFICE 2,127,034

LINEMAN SAFETY BELT

Frank Kabat, Lincoln, Nebr.

Application March 20, 1937, Serial No. 132,159

2 Claims. (Cl. 227—49)

My invention relates to lineman's safety belts, its primary object being a provision of a safety belt which is more comfortable in use and which lacks the hazards inherent in the prior safety belts.

Another object of my invention is the provision of a lineman's belt in which the hazards resulting from breaking or slipping belts is reduced to a minimum.

Another of my objects is the provision of a lineman's belt which eliminates the hazard of electrical contact with the body of the lineman.

Another object which I have in view is the provision of a lineman's belt having a rigid support for the lineman's back with complete freedom of shifting movements.

It is also my object to provide a lineman's belt which is designed for carrying the tools in fixed position relative to the lineman's body regardless of the shifting movements of the body during work.

Having in view these objects and others which will be pointed out in the following description, I will now refer to the drawing, in which Figure 1 is a view in perspective of my lineman's safety belt.

Figure 2 is a view in longitudinal section through the belt and reinforcing straps at one of the D-rings.

Figure 3 is a view in transverse section through the sheath and belt strap and reinforcing strap.

The belt strap 10 is preferably made of leather or similar material having the requisite tensile strength and pliability. The usual belt buckle 11 is secured to the strap 10 at one of its ends for securing the belt about the waist of the lineman. The strap 10 is reinforced in its rear portion by a reinforcing strap 12 which is folded back against itself and against the strap 10 at both ends of the strap 12 to provide loops 13 for the reception of the D-rings 14, the straps 10 and 12 being securely stitched together. The D-rings 14 are designed for the attachment of the pole strap 15, snap fasteners 16 being provided for the easy attachment and detachment of the pole strap. The liners 17 are secured within the loops 13 for receiving the shanks of the D-rings 14. My preferred material for the liners 17 is mule skin because of its superior wearing qualities.

The rear portion of the strap 10 and the major portion of the strap 12 are slidably encased within a semi-rigid sheath which is designed to support the lineman's tools. The sheath is relatively wide in order to provide ample support for the lineman's back. It is designed for a snug fit and in many cases it may be clipped to the lineman's back. It has the cross sectional form shown in Figure 3 and is made preferably from a single piece of harness leather by folding at the upper edge in the form of two overlapping layers 18 and 19. In vertical section the inner layer 18 is straight but the outer layer 19 is buckled to space the two layers apart. These layers are further spaced apart by the upper and lower beads 20 and 21 respectively. All parts are securely stitched together to provide a sheath for the sliding reception of the straps 10 and 12 which slide as a unit.

It should be noted that the length of the strap 12 is greater than that of the layer 19 but less than the length of the layer 18. Since the D-rings 14 are too large to enter the passageway between the layers, the extremities of the layer 19 serve as stops for the sliding movements of the strap 10. At the same time the D-rings 14 are always shielded by the end portions of the layer 18 from contact with the lineman's body.

The sheath is admirably adapted for carrying the lineman's tools. In my drawing I show one of the many possible arrangements for supporting tools on the sheath. A bag 22 may be attached with pockets for pliers or rules. As shown, the edge of the leather of the bag may take the place of a portion of the bead 21. The strap 23 may be secured to the sheath by means of rivets 24 passing through the layer 19 with loops in the desired positions and sizes.

In use, the lineman's belt is secured around the waist of the lineman by closing the buckle 11 in the usual manner. The lineman climbs the pole with his hooks, using his hands on the pole to maintain an upright position during climbing. While climbing, the pole strap 15 dangles from one of the D-rings 14, but when the lineman reaches his working position on the pole he releases one of the snap fasteners 16 and places the pole strap 15 around the far side of the pole after which the released snap fastener 16 is secured to the opposite D-ring 14. This maintains his upright position but leaves his hands free for the work. During this time the effective length of the strap includes the pole strap 15 as well as the reinforcing strap 12. The strap 12 is, however, integral with the portion of the strap 10 so that the tensile strength of the combined straps 10 and 12 is usually greater than that of the strap 15. In other words, the limit of the load will be governed by the tensile strength of the strap 15 which may ordinarily be obtained in any desired strength.

During the work at the top of the pole, the bodily movements are often very vigorous. In the ordinary strap there is a binding action at the lineman's back with the strap. In my belt, however, the belt strap slides freely within the sheath which is more or less firmly secured in fixed position at the back of the lineman. This freedom of slippage makes it possible for the lineman to swing his body through a much greater arc than is possible with the prior belts. The sheath is, moreover, admirably adapted for the support of tools in fixed position relative to the lineman's body. In the prior belts the tool holders are apt to shift with the belt thus making it inconvenient for the lineman to select the proper tool when needed. In my belt each tool is in fixed position where it can be instantly located by "feel" and without the necessity of looking down to find the proper tool.

The hazard of electrical contact is always present in a greater or less degree in all of the work which the lineman is called upon to do and a special effort has been made to design a lineman's belt having the minimum number of metallic parts and shielding the few necessary parts so that they cannot come into contact with the lineman's body as in summer when he works in rather scant clothing. The D-rings 14 are shielded by the end portions of the layer 18. The rivets 24 for securing the strap 23 to the layer 19 pass through that layer and are insulated from the lineman's body by means of the layer 18 and the straps 10 and 12 thus making a three-ply insulation. The leather itself is a good insulator but its effectiveness as an insulator is enhanced by the oils in the leather.

Having thus described my invention in such full, clear, and exact terms that its construction and operation will be readily understood by others skilled in the art to which it pertains, what I claim as new and desire to secure by Letters Patent of the United States is:

1. A lineman's belt and a sheath therefor, said sheath having a channel extending therethrough and being resilient and in a form for engaging the lineman's back at his waistline, said belt having slidable movement in said sheath, and a pair of rings secured to said belt for attachment of a pole strap thereto, said rings functioning as stops for limiting the sliding movements of said belt in said sheath.

2. A lineman's belt and a sheath therefor, said sheath having a channel extending therethrough for the slidable reception of said belt, a reenforcing strap secured to the rear portion of said belt and having loops at the extremities thereof, and pole strap rings secured in said loops and functioning as stops for limiting the sliding movements of said belt in said sheath, said pole strap rings embracing said belt.

FRANK KABAT.